Oct. 4, 1949.  E. E. SHERASKI  2,483,787
KNOCK-DOWN BOX STRUCTURE FOR FISHING
AND TIP-UP SIGNALING DEVICES
Filed Sept. 23, 1948  2 Sheets-Sheet 2
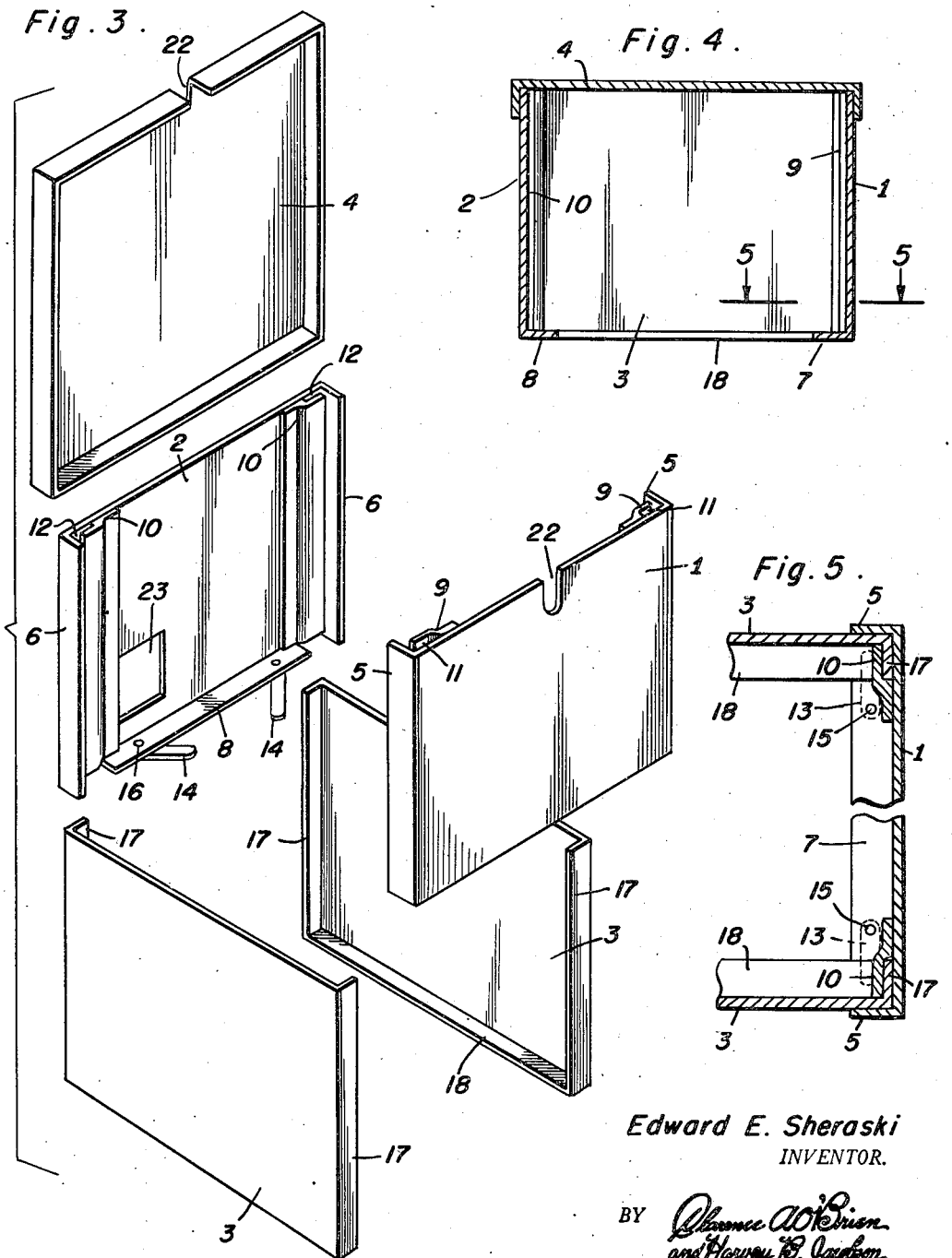
Edward E. Sheraski
INVENTOR.

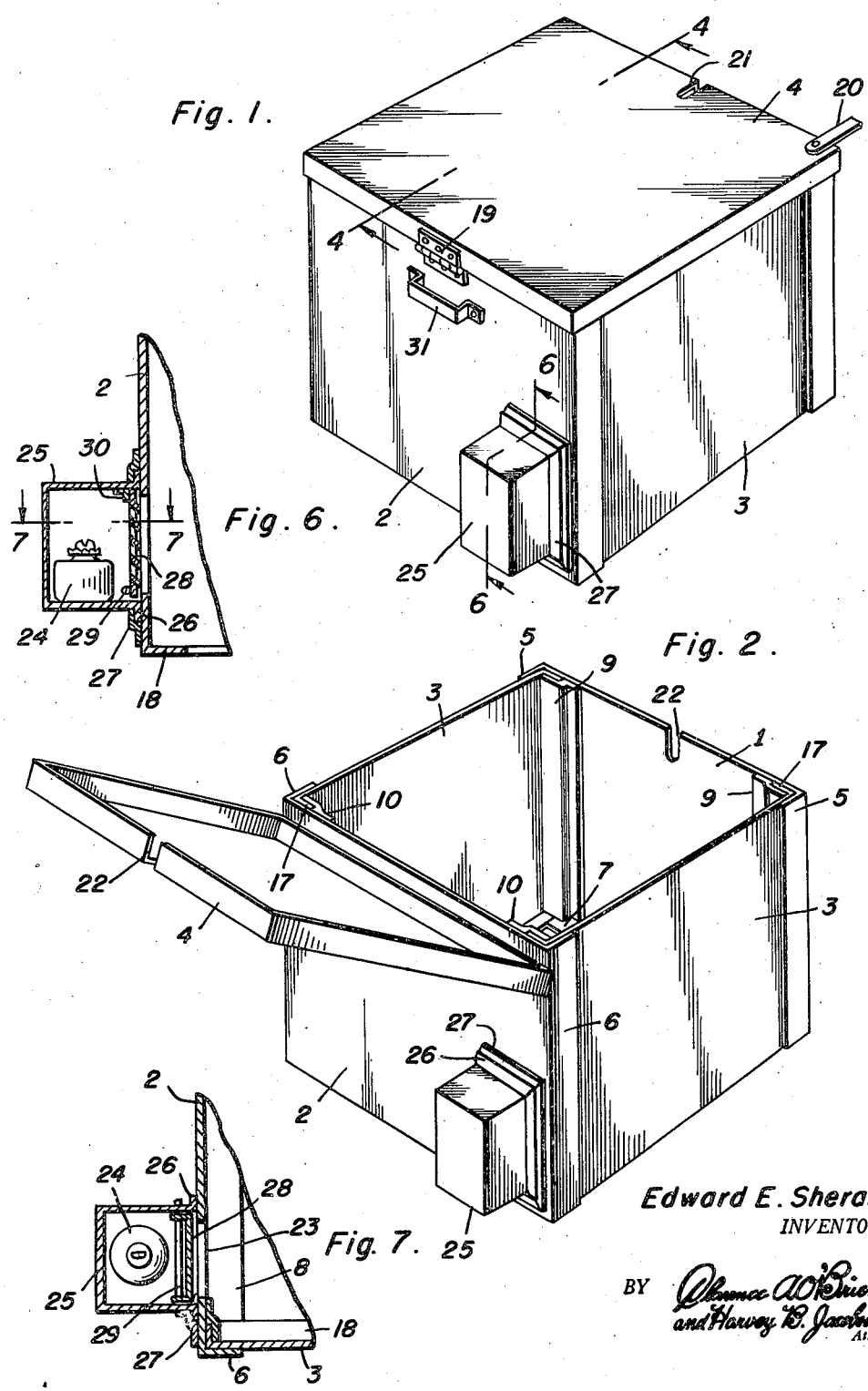

Patented Oct. 4, 1949

2,483,787

UNITED STATES PATENT OFFICE 2,483,787

KNOCKDOWN BOX STRUCTURE FOR FISHING AND TIP-UP SIGNALING DEVICES

Edward E. Sheraski, Manitowoc, Wis.

Application September 23, 1948, Serial No. 50,822

3 Claims. (Cl. 263—40)

My invention relates to knock down box structures for use as fishing equipment in fishing through a hole in ice and is designed as an improvement over the frame forming part of the combination fishing and tip up signalling device of my copending application Serial No. 37,174 filed July 6, 1948.

The primary object of my invention is to provide an inexpensive, light weight, box structure with an open bottom and closable top, for the use indicated, and which is formed of wall panels slidably fitting together in a manner to form overlapping vertical corner edges of double thickness of the material for reinforcing and weather proofing purposes.

Another object is to provide a box structure in which the wall panels are arranged for easy quick sliding into and from connected relation for assembling and knock down purposes respectively.

Still another object is to provide such a box structure with a quick attachable and detachable lamp housing adequately ventilated for combustion purposes and for transferring heat from a lamp therein into the box structure, and in which the lamp is protected against the flame being blown out by wind entering the box structure when used for the purpose indicated.

Other and subordinate objects, within the purview of my invention, together with the precise nature of my improvements will be readily understood when the succeeding description and claims are read with reference to the drawings accompanying and forming part of this specification.

In said drawings:

Figure 1 is a view in perspective of my improved box structure in a preferred embodiment thereof with the cover closed;

Figure 2 is a similar view with the cover open;

Figure 3 is a composite view in perspective of the front, rear and side panels, and the cover detached;

Figure 4 is a view in transverse section taken on the line 4—4 of Figure 1;

Figure 5 is a fragmentary view in horizontal section taken on the line 5—5 of Figure 4 and drawn to a larger scale;

Figure 6 is a fragmentary view in vertical section taken on the line 6—6 of Figure 1 and drawn to a larger scale;

Figure 7 is a fragmentary view in horizontal section taken on the line 7—7 of Figure 6.

Referring to the drawings by numerals, my improved knock down box structure, as shown, is of rectangular form and sheet metal, preferably, with front, rear and side wall panels 1, 2, 3, respectively, and a cover 4. The bottom of the box structure is open for setting on ice in surrounding relation to a hole in the ice and for containing fishing and signalling equipment, not shown, for fishing through the hole in a manner which will be understood.

The front and rear wall panels 1, 2 are alike, with the exception that each is provided with vertical right angled side edge flanges turned inwardly of the structure and designated 5 on the front wall panel 1 and 6 on the rear wall panel 2, said panels 1, 2 being also provided with an inturned, horizontal, right angled bottom edge flange designated 7 on said panel 1 and 8 on said panel 2 and which are spaced at the ends thereof from the vertical flanges 5, 6 for a purpose presently seen. The front and rear wall panels 1, 2 are further provided on the inner faces thereof with a pair of vertical guides adjacent the vertical flanges 5, 6 and designated 9 on the front wall panel 1 and 10 on the rear wall panel 2. The pairs of guides 9, 10 form with the vertical flanges 5, 6 pairs of vertical L-shaped guideways 11, 12 at opposite sides of said panels 1, 2 vertically aligned with the spaces between the vertical flanges 5, 6 and the horizontal flanges 7, 8 and extending substantially from top to bottom of said panels 1, 2. Pairs of locking fingers 13, 14 are pivoted, as at 15, 16, on the horizontal flanges 7, 8 beneath and adjacent opposite ends thereof to be swung into locking position in which the same extend beyond the ends of said horizontal flanges 7, 8 and bridge the spaces between the vertical flanges 5, 6 and the horizontal flanges 7, 8 for a purpose presently clear.

The side wall panels 3 are alike, each being provided with vertical, inturned, side edge flanges 17 and a similar horizontal bottom edge flange 18 connecting the vertical flanges 17, the vertical flanges 17 being slidable upwardly in the guideways 11, 12 from the bottoms of said guideways and the horizontal flanges 18 fitting in the space between the vertical flanges 5, 6 and the horizontal flanges 7, 8 flush with the latter to form with said flanges 7, 8 a continuous internal flange structure around the box structure with the horizontal flanges 18 abutting the lower ends of the guides 9, 10 to limit upward sliding of the vertical flanges 17.

The cover 4 is of the flanged type and is hinged, as at 19, to the rear wall panel 2 to swing down and fit around said wall panels 1, 2, 3. A front corner handle 20 is provided on the cover 4 for manipulating the same and a front edge notch 21 is provided in said cover 4 for registration with an upper edge notch 22 in the front wall panel 1 to permit a signalling staff to extend out of the box structure and which forms no part of the instant invention and, therefore, has not been illustrated in the drawings.

The rear wall panel 2 is provided with a rectangular, lower corner opening 23 for admitting heat from a lamp 24 into the box structure to prevent freezing of equipment in said box structure and illuminating the interior of said structure in night fishing, and a rectangular, open front, lamp housing 25 is attached, by means presently described, to the rear face of the rear wall panel 2 over said opening 23.

The attaching means for the lamp housing 25 comprises a front edge, external, flange 26 extending around said housing and slidably fitting at one side and the top and bottom of said housing in an overlapping frame 27 suitably secured to said wall panel 2 around the top, bottom and one side of said opening 23. A louvre plate 28 is hinged at its bottom edge, as at 29, in the open front of the lamp housing 25 to be swung outwardly of said housing when the housing is detached and provide for access to the lamp 24. A top rib 30 in said housing 25 coacts with the top edge of the opening 23 to hold the louvre plate 28 upright when the lamp housing 25 is attached. The louvre plate 28 provides for transfer of heat into the box structure from the lamp 24 and for admitting air for combustion purposes into said housing, as well as for access to the lamp 24 when said housing is detached.

A handle 31 on the rear wall panel 2 provides a hand grip for lifting and transporting the box structure.

To knock down and take apart the described box structure, the locking fingers 13, 14 are swung into an unlocking position from beneath the horizontal flanges 18, and the side wall panels 3 are then pulled, or otherwise forced, downwardly to slide the vertical flanges 17 out of the guideways 11, 12. This disconnects the wall panels 1, 2 and 3. The lamp housing 25 is slid out of the keeper frame 27 to detach the same. The disassembled parts may then be stacked, with the cover 4 swung parallel with the rear wall panel 2, into a compact bundle for carrying or storing.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. A knock down box structure comprising a front, a rear and side wall panels, respectively, having right angled vertical side edges, the vertical side edges of the side wall panels being slidable upwardly in the vertical side edges of the front and rear wall panels from the bottom of said front and rear panels, and guides on the front and rear wall panels spaced from the right angled vertical edges thereof and overlapping the vertical side edges of the side wall panels, said side wall panels having horizontal bottom edge flanges abutting the guides to limit upward sliding of the side wall panels relative to the front and rear wall panels, said front and rear wall panels having horizontal bottom edge flanges lying flush with and fitting between the horizontal bottom edge flanges of said side wall panels in the limit of upward sliding of said side wall panels.

2. A knock down box structure comprising a front, a rear and side wall panels, respectively, having right angled vertical side edges, the vertical side edges of the side wall panels being slidable upwardly in the vertical side edges of the front and rear wall panels from the bottom of said front and rear panels, and guides on the front and rear wall panels overlapping the vertical side edges of the side wall panels, said side wall panels having horizontal bottom edge flanges abutting the guides to limit upward sliding of the side wall panels relative to the front and rear wall panels, and means pivoted on the front and rear side wall panels for swinging beneath said horizontal bottom flanges to lock said side wall panels in upwardly sliding position.

3. In a box structure, a wall panel having an opening therein for admitting heat into said structure, an open front lamp housing for attachment to said wall panel over said opening to contain a lamp for generating heat, means for attaching said housing comprising an external front edge flange on said housing and a keeper frame surrounding said opening part way and into which said flange is slidable, and a louvre plate in the open front of said housing for preventing the lamp from being blown out and admitting air to said housing for combustion purposes, said plate being pivoted in said housing for swinging out of the same for access to said lamp when said housing is detached and being held against such swinging by engagement with an edge of said opening when the housing is attached.

EDWARD E. SHERASKI.

REFERENCES CITED

The following references are of record in the file of this patent:

UNITED STATES PATENTS

| Number | Name | Date |
|---|---|---|
| 761,451 | Cuvelier | May 31, 1904 |
| 813,944 | Bubar | Feb. 27, 1906 |
| 886,530 | Mestemacher | May 5, 1908 |
| 1,023,577 | List et al. | Apr. 16, 1912 |
| 1,040,387 | Nall | Oct. 8, 1912 |
| 1,414,948 | Hazen | May 2, 1922 |
| 2,332,299 | Cohn | Oct. 19, 1943 |

FOREIGN PATENTS

| Number | Country | Date |
|---|---|---|
| 414,622 | Germany | 1925 |